2,949,335

TREATMENT OF TANNED HIDES AND LEATHER WITH POLYMERS OF VINYL AND DIENE MONOMERS, EMULSIFIERS AND TANNING AGENTS

Gustav Mauthe, Opladen, Wilhelm Graulich, Leverkusen-Bayerwerk, and Heinz Röhling, Leverkusen, Germany, assignors to Farbenfabriken Bayer Aktiengesellschaft, Leverkusen, Germany, a corporation of Germany No Drawing. Filed Mar. 7, 1956, Ser. No. 569,970

Claims priority, application Germany Mar. 11, 1955

4 Claims. (Cl. 8—94.23)

This invention relates to a new process of preparing leather.

For the purpose of improving the usefulness of leather the hides are frequently subjected to special processes after tanning. There may be mentioned for instance (a) The treatment with fatty emulsions (fat liquoring process), (b) The mechanical incorporation of oils and fats, (c) The impregnation of the dry leather with a molten resinous mixture of fats and paraffins, and (d) The impregnation of the dry leather with organic solutions of higher molecular weight resins and polymers.

(e) In recent years attempts were made to incorporate into the leather polymerizable vinyl or diene compounds and to polymerize these compounds in the leather (see for instance Oehler and Kilduff, Research Paper RP 1951, vol. 42, January 1949, Part of the Journal of Research of the National Bureau of Standards).

(f) It has also been proposed to incorporate into the leather relatively low molecular weight, incompletely polymerized vinyl compounds and to complete the polymerization of these compounds by heating in the presence of catalysts.

All methods using solvents involve considerable disadvantages since they are uneconomic and cumbersome for large scale operation (see for instance JALCA, 44, 1949, page 284, Cheronis etc.).

It has further been proposed to employ polymers in the form of latices. This process would be particularly useful in tanning since it can be adapted to treating wet leather during the manufacturing process.

The adaptation of this process, however, involves insurmountable obstacles, especially as far as thick and heavy leather is concerned. These difficulties result from the fact that the stability of the polymerization emulsion is not sufficient to secure an adequate rate of penetration into the leather and the addition of larger quantities of emulsifiers and stabilizers does not suffice to allow safe working. If, for instance, the emulsion becomes unstable during the process and the polymer precipitates on the surface of the leather it is no longer possible to render the leather again useful for application by simple means, for instance with water.

In accordance with the invention we have found that thick, heavy leather tanned with vegetable tannins can be impregnated with aqueous emulsions, preferably high molecular weight vinyl polymers, by causing polymerizable emulsions which contain emulsifiers or stabilizers, to react on the leather in admixture with anionic vegetable and/or synthetic tannins. These emulsions are preferably applied in a mechanical milling operation, for instance in a drum or hot-air drum.

The treatment according to the invention may be carried out before, during or after tanning.

It is surprising that substances—as vegetable and synthetic tannins—which are known to exert a disturbing action on emulsion systems allow a deep penetration into the leather, to a degree hitherto unattainable, and permit safe operation of the process provided that the polymerization emulsions and the quantitative proportions are appropriate in any given case.

Suitable polymerization emulsions are those prepared from vinyl compounds such as dichloroethene, vinylchloride, acrylic esters, styrene and acrylonitrile, either alone or in admixture, or with diene compounds applied in sufficient quantities.

The choice of the emulsifiers for polymerization and their quantitative proportion depend upon the desired particle size. Care has to be taken that the proportion of emulsifiers amounts to at least 2%, preferably more, of the dry substance in the latices; this may be effected, if necessary, by further addition of emulsifiers after polymerization.

As emulsifiers there may be used anionic emulsifiers containing sulfonic acid groups. Cationic or even non-ionic emulsifiers having marked tannin-precipitating properties may also be used instead of anionic emulsifiers for the aforesaid process. As non-ionic or cationic emulsifiers there may be mentioned the hydroxy-ethylation products of aliphatic or aromatic alcohols, carboxylic acids of amines containing a greater number of ethylene oxide radicals per mol, the water-soluble salts or quaternary products of long chain aliphatic amines and the like. It is also possible to use anionic emulsifiers in admixture with lower portions of non-ionic and cationic emulsifiers.

For the impregnation of all-chrome tanned leather any composition of suitable tanning agents and emulsions of polymers may be used without reference to the emulsifier applied. When preparing semi-chrome tanned leather, the impregnation is preferably carried out after the chrome-tannage. Also in this case, any desired combination of emulsifiers may be used for the impregnation.

When treating heavy vegetable-synthetically tanned leather with mixtures of tanning agents and emulsions of polymers, it is advisable to prepare the emulsion with the application of anionic emulsifiers. In this case, only a portion of the anionic emulsifier should be replaced by non-ionic or cationic emulsifiers if it is desired to obtain impregnations of increased water-resistance. Light vegetable-synthetically tanned leather such as, for example, bastards, vachettes, sides and the like may be impregnated, however, with mixtures of tanning agents and emulsions of polymers containing only a non-ionic emulsifier.

Suitable tannins for the herein described process are vegetable tanning extracts, especially quebracho and mimosa extracts, as well as synthetic tannins, for instance those obtained by the precess described in German Patents Nos. 675,773, 611,671 and 676,272 and French Patent No. 897,222. Furthermore purified sulfiate waste liquors containing salts of lignin sulfonic acid may be used.

The relative amounts of the tannin and the polymer may be varied within wide limits. Preferably, mixtures in the ratio 1:1 to 1:5 are applied. The reaction should be carried out in a neutral or acid medium, or in a weakly alkaline medium so that the acidity of the leather is preserved, after the herein described treatment, to a sufficient degree.

Depending upon the choice of the polymer, emulsifier and tannin—the nature of the component and the proportions used are of special importance—mixtures are obtained, whose gelation times are sufficiently long to permit practical application or which remain unchanged for an indefinite period of time.

The invention enhances the utility of chrome leather and leather tanned with vegetable and/or synthetic tannins. Chrome leather is least resistant to the penetration of polymerization emulsions but even in this case by proceeding according to the invention the distribution within the leather is improved and the absorption accelerated. The treatment of leather with the above described emulsions of polymers and tannins may be preferably carried out before tanning, preferably, however, during or after tanning. For instance in the preparation of vache sole leather, the raw hides may be pretanned by full penetration, squeezed off by shaving, levelled and the shaved leather impregnated. The hides may then be retanned as usual in the handler, drum or layer. The emulsion containing the tannin and the polymer may also be milled into the leather after retanning according to the so-called vache seasoning in the hot air drum, or the treatment may be carried out at an intermediate moment. Tanning oils, fillers and bleaching agents may additionally be employed in the treatment according to the invention.

The process leads to essential improvements of leather as regards their tear resistance, impermeability and resistance to abrasion.

This application is a continuation-in-part of our copending application Ser. No. 394,514, filed Nov. 25, 1953.

The invention is further illustrated by the following examples, without being restricted thereto, the parts being by weight.

*Example 1*

65 kg. of a mixture of 52.5 parts of a 40% copolymerization emulsion (consisting of dichloroethene, butyl acrylate and 15 parts of the sodium salt of long chain paraffin sulfonic acids referred to 100 parts of the dry polymer) and 12.5 parts of a 56% tannin, which is obtained according to French Patent No. 897,222, are milled into 300 kg. of tanned, appropriately humid vache sole leather butts for two hours. The leather is then finished in the usual manner.

The leather thus obtained is of higher water-repellency, higher imperviousness to water and higher resistance to abrasion—which constitutes an improvement of its usefulness—than leather tanned in the usual manner, as may be seen from the following figures:

WATER-ABSORPTION ACCORDING TO KUBELKA AND NEMEC

|  | Leather treated acc. to Example 1 | Comparative leather (tanned as usual) |
|---|---|---|
| after 15 minutes____percent__ | 15.5 | 28.5 |
| after 30 minutes_____do____ | 20.0 | 32.0 |
| after 60 minutes_____do____ | 24.5 | 37.0 |
| after 120 minutes_____do____ | 28.5 | 38.5 |
| Quotient of permeability to water according to Stather-Herfeld_____ | 0.918 / 0.611 | 0.372 / 0.191 |
| Tensile strength___kg./cm.² | 321.4 | 253.0 |

|  | loss of weight, mg. | loss of height, mm. | loss of weight, mg. | loss of height, mm. |
|---|---|---|---|---|
| Abrasion—after grinding: |  |  |  |  |
| for 40 meters_____ | 210 | 0.9 | 280 | 1.01 |
| for another 40 meters___ | 135 | 0.62 | 160 | 0.80 |
| Do_____ | 135 | 0.71 | 230 | 1.40 |

*Example 2*

100 kg. of neutralized sammed chrome upper leather are milled in 200 liters of water with 9 kg. of the dry substance of a copolymer emulsion, which is obtained from butadiene, acrylonitrile, styrene and an emulsifier according to German Patent No. 821,997, and 3 kg. of the dry substance of mimosa extract at an initial temperature of 50° C. for 24 hours and then finished as usual.

Apart from the improvements mentioned in Example 1, the leather obtained shows an especially improved tear resistance, which renders the leather suitable for wider application.

*Example 3*

(a) 100 kg. of delimed cow hides are pretanned with 30 kg. of a tannin consisting of the mixture of the ammonium salt of a naphthalene sulfonic acid formaldehyde condensation product and the ammonium salt of a β-naphthol sulfonic acid cresol formaldehyde condensation product. After the tannin solution is sufficiently exhausted it is diluted with water. 30.9 kg. of a mixture of 25 parts of a 40% copolymerization emulsion according to Example 1 and 5.9 parts of a tannin according to French Patent No. 897,222 are then added. The leather is milled in this solution until the latter is exhausted and is then retanned in known manner in a series of pits and the drum and then finished without plumping tannage in the usual manner.

(b) 100 kg. of delimed cow hides are pickled and pretanned with 0.6% of chromium oxide. After neutralization the leather is subjected to the treatment of an aqueous solution of 300 liters of water, which contains 30.9 kg. of a mixture according to Example 3(a), and finished in the usual manner.

(c) 100 kg. of delimed cow hides are pretreated with a solution of 100 liters of water, 16.5 kg. of sodium chloride and 5 liters of concentrated hydrochloric acid in the drum and subsequently milled with 150 liters of water and 20 kg. of sodium thiosulfate until the interior of the hide has reached a pH value of about 5.2–5.4. The hides are pretaned in a series of pits. Thereupon the leather is retanned in the drum with 30.9 kg. of a mixture according to Example 3(a), which has previously been diluted, and then finished as described in the preceding example.

Light colored, very firm leather of higher water-repellency, water impermeability and resistance to abrasion than leather tanned in the usual manner are obtained.

WATER-ABSORPTION ACCORDING TO KUBELKA AND NEMEC

|  | Leather treated acc. to Example 3 | comparative leather (tanned as usual) |
|---|---|---|
| after 15 minutes_____percent__ | 10 | 33 |
| after 30 minutes_____do____ | 21.5 | 35 |
| after 120 minutes_____do____ | 27 | 37.5 |
| after 1,440 minutes_____do____ | 33 | 42 |
| Quotient of permeability to water according to Stather-Herfeld_____ | 0.620 / 0.450 | 0.140 / 0.120 |
| Tensile strength: |  |  |
| length-wise_____kg./cm.² | 258 | 232 |
| cross-wise_____kg./cm.² | 184 | 118 |

|  | (Loss of height) mm. | (Loss of height) mm. |
|---|---|---|
| Abrasion—after grinding: |  |  |
| for 40 meter_____ | 3.07 | 1.19 |
| for another 40 meters_____ | 0.39 | 0.49 |
| Do_____ | 0.36 | 0.41 |
| Do_____ | 0.33 | 0.50 |
| Do_____ | 0.39 | 0.53 |
| Do_____ | 0.41 | 0.54 |

*Example 4*

100 kg. of delimed cow hides are pretanned in the drum with 75.3 kg. of a mixture of 36 parts of a 50% tannin, which is obtained from the mixture of the ammonium salt of a naphthalene sulfonic acid formaldehyde condensation product and the ammonium salt of a β-naphthol sulfonic acid cresol formaldehyde condensation product acidified with formic acid, 25 parts of a 40% polymerization emulsion (consisting of dichloroethene, butyl acrylate and the sodium salt of long chain paraffin sulfonic acids) and 14.3 parts of sodium thiosulfate. After appropriate exhaustion of the tanning solution formic acid is slowly added until the interior of the leather shows a pH value of 4.2–4.5. The leather is then retanned in a series of pits and in the drum as usual and finished without the addition of fillers.

Firm mellow leather with very good water-repellent, water-tight and abrasion-resistant properties is obtained.

Example 5

100 kg. of delimed cow hides are preheated with sodium thiosulfate according to Example 4 and pretanned in a series of pits. The leather is then milled in the drum with a mixture of 16.1 parts of the emulsion of a copolymer of butadiene, acrylonitrile and the sodium salt of long chain paraffin sulfonic acids and 3.2 parts of a 56% tannin, which is obtained according to French Patent No. 897,222, until the tanning solution is appropriately exhausted. The leather is then tanned in a series of pits, retanned in the drum and/or handler and then finished without the addition of fillers.

Example 6

46.3 kg. of a mixture of 25 parts of a 40% copolymer emulsion according to Example 4 and 6.3 parts of a tannin, which is obtained according to French Patent No. 897,222, are milled in a preheated drum into 100 kg. of appropriately wet vache sole leather butts, which were tanned in a series of pits. The leather, which has absorbed the tanning emulsion of the polymer well and uniformly, is retanned in the drum and/or the handler in known manner and finished without the addition of fillers.

A leather of good firmness and good elasticity is obatined, which is of higher water repellency, water impermeability and resistance to abrasion than leather tanned in the usual manner.

Example 7

100 parts of cow hide are pretanned with 1.5 percent of chromic oxide, neutralised and subsequently drummed with 26.3 parts of a 38 percent emulsion of polymers prepared according to known methods in aqueous solution of dichloroethene, acrylic acid butyl ester and a polyglycol emulsifier (reaction product of 30 mol of ethylene oxide and cetyl alcohol), 5.9 parts of a 56 percent tanning agent obtained according to Example 1 of French patent specification No. 897,222, and 16 parts of water. The leather is then tanned in usual manner in colour pits and drum and finished. The properties of rolled dry leather thus treated are greatly improved in use compared with untreated leather. Water-absorption in percentages (according to Kubelko-Nemec):

|  | after ¼ hour | after 2 hours | after 24 hours |
| --- | --- | --- | --- |
| treated | 19.5 | 34.5 | 38.0 |
| untreated | 38.0 | 41.0 | 44.0 |

Quotient of water-permeability (according to Stather-Herfeld): treated 2.402; untreated 0.715.

Example 8

100 parts of pretanned bastard leather are drummed, rinsed and then treated in the drum with 26.3 parts of a 38 percent emulsion of polymers prepared from dichloroethene, acrylic acid butyl ester and a polyglycol emulsifier (reaction product of stearylamine with 8 mol of ethylene oxide, transformed into the quaternary form by addition of benzyl chloride) in aqueous solution according to known processes, 6.6 parts of sulphonated quebracho and 150 parts of water until complete exhaustion of the liquor. The leather is then after-tanned with 9 parts of a tanning agent obtained according to Example 1 of German patent specification No. 611,671, dried and finished in usual manner.

Quotient of water-permeability (according to Otto): untreated leather 0.08; treated leather 1.8.

Example 9

100 parts of calf skin are tanned with 2.5 percent of chromic oxide, neutralised, then liquored with sulphited and unsulphited oils, and after-tanned with 8 parts of a tanning agent obtained according to Example 1 of German patent specification No. 611,671. The leather is then treated with 26.3 parts of a 38 percent emulsion of copolymers prepared according to known processes in aqueous solution of butadiene, acrylonitrile, styrene and a polyglycol emulsifier (reaction product of 30 mol of ethylene oxide and cetyl alcohol) in admixture with Mersolate, 5.9 parts of a 56 percent tanning agent obtained according to German patent specification No. 696,272, and 100 parts of water.

The leather is then after-tanned with 5 parts of a 50 percent tanning agent obtained according to Example 1 of German patent specification No. 611,671, fat-liquored with sulphited and unsulphited oils and finished in usual manner.

This treatment substantially improves the grain resistance and yields an increase in plumpness by 20 percent.

We claim:

1. The process which comprises contacting tanned hides and leather with an aqueous emulsion of a member selected from the group consisting of homopolymers and copolymers of vinyl- and diene-monomers and with at least 2% of a member selected from the group consisting of anionic, non-ionic, and cationic emulsifiers in the presence of at least one tanning agent selected from the group consisting of anionic vegetable and synthetic tanning agents, said synthetic tanning agents being phenolic-hydroxyl-group-containing and sulfonic-acid-group-containing tanning agents, said contacting being conducted in a medium selected from the group consisting of a neutral, an acid, and a weakly alkaline medium, so as to preserve the acidity of the leather.

2. The process which comprises contacting tanned hides and leather with an aqueous emulsion of a copolymer of butadiene, acrylonitrile and styrene with at least 2% of a member selected from the group consisting of anionic, non-ionic and cationic emulsifiers in the presence of at least one tanning agent selected from the group consisting of anionic vegetable and synthetic tanning agents, said synthetic tanning agents being phenolic-hydroxyl-group-containing and sulfonic-acid-group-containing tanning agents, said contacting being conducted in a medium selected from the group consisting of a neutral, an acid, and a weakly alkaline medium, so as to preserve the acidity of the leather.

3. The process which comprises contacting tanned hides and leather with an aqueous emulsion of a copolymer of dichloroethene and butylacrylate with at least 2% of a member selected from the group consisting of anionic, non-ionic and cationic emulsifiers in the presence of at least one tanning agent selected from the group consisting of anionic vegetable and synthetic tanning agents, said synthetic tanning agents being phenolic-hydroxyl-group-containing and sulfonic-acid-group-containing tanning agents, said contacting being conducted in a medium selected from the group consisting of a neutral, an acid, and a weakly alkaline medium, so as to preserve the acidity of the leather.

4. The process which comprises contacting tanned hides and leather with an aqueous emulsion of a copolymer of butadiene and acrylonitrile with at least 2% of a member selected from the group consisting of anionic, non-ionic and cationic emulsifiers in the presence of at least one tanning agent selected from the group consisting of anionic vegetable and synthetic tanning agents, said synthetic tanning agents being phenolic-hydroxyl-group-containing and sulfonic-acid-group-containing tanning agents, said contacting being conducted in a medium selected from the group consisting of a neutral, an acid, and a weakly alkaline medium, so as to preserve the acidity of the leather.

References Cited in the file of this patent

UNITED STATES PATENTS

| 2,721,145 | Cheronis | Oct. 18, 1955 |
| 2,746,837 | Kirk | May 22, 1956 |

FOREIGN PATENTS

| 131,036 | Australia | Jan. 18, 1949 |
| 821,997 | Germany | Nov. 22, 1951 |
| 720,505 | Great Britain | Dec. 22, 1954 |
| 563,288 | Great Britain | Aug. 8, 1944 |
| 585,118 | Great Britain | Jan. 30, 1947 |